United States Patent Office 3,213,124
Patented Oct. 19, 1965

3,213,124
AROMATIC AZOMALONONITRILES
William A. Sheppard, Wilmington, Del., assignor to E. I. du Pont de Nemours and Company, Wilmington, Del., a corporation of Delaware
No Drawing. Filed May 14, 1962, Ser. No. 194,671
10 Claims. (Cl. 260—465)

This invention relates to new substituted aromatic hydrazones of carbonyl cyanide (or aromatic azomalononitriles) and to their preparation. More particularly this invention relates to the halogenated ether and thioether substituted aromatic hydrazones of carbonyl cyanide and to compositions containing said hydrazones and to their use.

This application is a continuation-in-part of my application Serial No. 53,602, filed September 2, 1960, and now abandoned.

It is an object of this invention to provide new substituted aromatic hydrazones of carbonyl cyanide (or aromatic azomalononitriles) and to provide a process for their preparation. A further object is to provide novel compositions containing said substituted aromatic hydrazones of carbonyl cyanide as the active ingredient and processes for their use. Other objects will appear hereinafter.

These and other objects of this invention are accomplished by the following compounds, namely, the polyfluoroalkoxy- and polyfluoroalkylthio-aromatic hydrazones of carbonyl cyanide. These substituted aromatic hydrazones of carbonyl cyanide have at least one polyfluoroalkyl group attached to an oxygen or sulfur atom which in turn is directly attached to nuclear carbon of the aromatic group. The preferred compounds are the perfluoroalkoxyaromatic hydrazones of carbonyl cyanide, the ω-hydroperfluoroalkoxyaromatic hydrazones of carbonyl cyanide, the perhaloalkylthioaromatic hydrazones of carbonyl cyanide, and the ω-hydroperhaloalkylthioaromatic hydrazones of carbonyl cyanide. These compounds are particularly effective as plant growth regulators.

The compounds of this invention can be alternatively named as the corresponding polyfluoroalkoxy- or polyfluoroalkylthio-aromatic azomalononitriles, which the tautomeric forms of the polyfluoroalkoxy- or polyfluoroalkylthio-aromatic hydrazones of carbonyl cyanide. The preferred polyfluoroalkyl compounds can be represented by the Formulas I—$(YC_nF_{2n}X)_mArN=NCH(CN)_2$ and II—$(YC_nF_{2n}X)_mArNHN=C(CN)_2$, wherein Ar represents an aromatic hydrocarbon radical of generally 6–12 carbons, $n$ is an integer of at least one and generally not over 10, $m$ is an integer of at least one and preferably not over three, Y is hydrogen or fluorine, and X is oxygen or sulfur. The infrared spectra indicate that form II, i.e., polyfluoroalkoxy- and polyfluoroalkylthio-aromatic hydrazones of carbonyl cyanide, is the more important form. For this reason, the compounds are generally referred to by name, based on the latter structure, and will be so designated herein, although a mixture of both types can be obtained by methods of synthesis. When the polyfluoroalkyl radical is trifluoromethyl, the compounds can be represented by the Formulas III—
$(CF_3X)_mArN=NCH(CN)_2$ and IV—
$(CF_3X)_mArNHN=C(CN)_2$ where Ar, X and $m$ are defined as aforesaid. The compounds of this invention include those as represented in the above formulas. The aromatic hydrocarbon group has at least six carbons, e.g., phenyl, and may have an additional inert substituent e.g., as in diphenyl, tolyl, naphthyl, chlorophenyl, dichlorophenyl, fluorophenyl, bromophenyl, nitrophenyl, etc., wherein the additional inert groups include halogen (particularly of atomic number of not over 35) and hydrocarbon, such as phenyl and lower alkyl of 1–6 carbon atoms.

In addition to compounds specifically illustrated hereinafter, the new compounds of this invention include the p-trifluoromethoxy-o-tolyl-hydrazones of carbonyl cyanide, 4-phenyl-2-trifluoromethoxyphenylhydrazone of carbonyl cyanide, beta-trifluoromethoxy-alpha-naphthylhydrazone of carbonyl cyanide, 2-fluoro-4-trifluoromethoxyphenylhydrazone of carbonyl cyanide, 2-nitro-4-trifluoromethoxyphenylhydrazone of carbonyl cyanide, and p-(perfluoro-n-decoxy)phenylhydrazone of carbonyl cyanide. Also included within the scope of this invention are p-trifluoromethylthio-o-tolylhydrazone of carbonyl cyanide, 4-phenyl-2-trifluoromethylthiophenylhydrazone of carbonyl cyanide, β-trifluoromethylthio-α-naphthylhydrazone of carbonyl cyanide, 2-fluoro-4-trifluoromethylthiophenylhydrazone of carbonyl cyanide, 2-nitro-4-trifluoromethylthiophenylhydrazone of carbonyl cyanide, p-(perfluoro-n-decylthio)phenylhydrazone of carbonyl cyanide, p-(ω-hydroperfluorobutylthio)phenylhydrazone of carbonyl cyanide, p-(ω-hydroperfluorooctylthio)phenylhydrazone of carbonyl cyanide, p-(ω-hydroperfluorobutoxy)phenylhydrazone of carbonyl cyanide, and p-(ω-hydroperfluorooctyloxy)phenylhydrazone of carbonyl cyanide.

The new polyfluoroalkoxy- and polyfluoroalkylthio-aromatic hydrazones of carbonyl cyanide are solids. They are crystalline and exhibit solubility in organic solvents. They are generally yellow to orange in color. Although they are not soluble in water, particularly if the pH is on the acid side, they are generally soluble in aqueous solutions containing a small amount of a basic material, e.g., sodium bicarbonate or sodium carbonate. Compositions containing the polyfluoroalkoxy- and polyfluoroalkylthio-aromatic hydrazones of carbonyl cyanide in a carrier, e.g., an inert medium, such as in aqueous or organic liquids or solvents, have valuable growth inhibiting properties as hereinafter disclosed.

The new compounds of this invention are obtained by contacting and reacting malononitrile with a diazonium salt of a polyfluoroalkoxy- or polyfluoroalkylthio-aromatic amine, particularly a perfluoroalkoxy- or perfluoroalkylthio-aromatic amine. The general technique of this reaction and methods for the preparation of intermediates are more completely described by reference to specific examples.

The following examples, in which the parts are by weight, further illustrate the preparation and properties of the new compounds and compositions of this invention.

EXAMPLE I.—m-TRIFLUOROMETHOXYPHENYL-HYDRAZONE OF CARBONYL CYANIDE

A solution of 5.6 parts of m-trifluoromethoxyaniline in 100 parts of water containing 8 parts of 12 N hydrochloric acid was cooled to below 0° C. by the addition of ice. A solution of 2.21 parts of sodium nitrite in 20 parts of water was added slowly, with the addition of more ice as necessary to maintain the temperature below 0° C. A solution of 2.09 parts of malononitrile in 100 parts of water was added and then 63 parts of 1 N sodium hydroxide solution. The resulting yellow precipitate was isolated by filtration. After recrystallization from hot chloroform, the product melted at 135–136° C. and amounted to 6.13 parts or 79.7% of the theoretical. It was soluble in dilute sodium carbonate solution and regenerated by acidification of the solution. The infrared spectrum, taken on a mineral oil mull of the compound, showed characteristic absorption bands at 3300, 2240, 1620, 1560, 1300, 1210, 1160, and 793 cm.$^{-1}$. These properties are consistent with the structure of the m-trifluoromethoxyphenylhydrazone of carbonyl cyanide.

The m-trifluoromethoxyaniline used in the above was obtained as follows: A pressure vessel was flushed with nitrogen and charged with a mixture of 150 parts of m-nitrophenol and 100 parts of carbonyl fluoride and heated at 100° C. for one hour and 140° C. for 2–3 hours. The resulting unpurified fluoroformate was heated with 130 parts of sulfur tetrafluoride at 100° C. for two hours, 150° C. for two hours, and 175° C for two hours. There was obtained 148.5 parts of m-nitrophenyl trifluoromethyl ether (m-trifluoromethoxynitrobenzene-m-$NO_2C_6H_4OCF_3$)

as a water-white liquid, boiling at 96° C./20 mm.; $n_D^{25}$, 1.4591. Its identity was confirmed by the ultraviolet absorption and nuclear magnetic resonance spectra and by elemental analysis.

*Analysis.*—Calcd. for $C_7H_4F_3NO_3$: C, 40.6; H, 1.95; F, 27.5; N, 6.8. Found: C, 40.9; H, 2.04; F, 27.5; N, 6.7.

A pressure vessel was charged with 36.3 parts of m-nitrophenyl trifluoromethyl ether, about 40 parts of anhydrous ethanol, and one part of 5% palladium-on-charcoal catalyst. Hydrogen was then introduced under pressure at 25° C. until absorption ceased. There was obtained 26.8 parts of m-aminophenyl trifluoromethyl ether (m-trifluoromethoxyaniline) as a substantially colorless liquid, B.P. 89° C./20 mm.; $n_D^{26}$, 1.4633.

*Analysis.*—Calcd. for $C_7H_6F_3NO$: C, 47.5; H, 3.4; F, 32.2; N, 7.9. Found: C, 47.8; H, 3.65; F, 32.1; N, 8.2.

EXAMPLE II.—p-TRIFLUOROMETHOXYPHENYL-HYDRAZONE OF CARBONYL CYANIDE

The general procedure of the first part of Example I was repeated except that p-trifluoromethoxyaniline was employed in place of the meta isomer. The product from 6 parts of this material was 4.57 parts of the p-trifluoromethoxyphenylhydrazone of carbonyl cyanide, after recrystallization from chloroform, or 55.4% of the theoretical yield. The compound melted at 173° C. with decomposition.

The p-trifluoromethoxyaniline was prepared as follows:

A pressure-resistant vessel was charged with a mixture of 139.1 parts of p-nitrophenol and 100 parts of carbonyl difluoride and heated at 100° C. for ½ hour and 140° C. for 2.3 hours. The resulting reaction product was heated with 120 parts of sulfur tetrafluoride at 100° C. for two hours, 150° C. for two hours, 150–175° C. for two hours, and 175° C. for two hours. There was obtained 166.4 parts of p-nitrophenyl trifluoromethyl ether (p-trifluoromethoxynitrobenzene) as a water-white liquid. The identity of the compound was confirmed by the ultraviolet absorption and nuclear magnetic resonance specta and by elemental analysis. The compound had the following physical properties: B.P. 101° C./22 mm.; M.P. −15 to −15.5° C.; $n_D^{25}$, 1.4653.

*Analysis.*—Calcd. for $C_7H_4F_3NO_3$: C, 40.6; H, 1.93; F, 27.5; N, 6.8. Found: C, 41.0; H, 2.18; F, 27.5; N, 7.1.

A pressure vessel was charged with 24.4 parts of p-nitrophenyl trifluoromethyl ether, about 40 parts of anhydrous ethanol, and one part of 5% palladium-on-charcoal catalyst. The charged vessel was connected to a source of hydrogen and the nitro compound reacted at 25° C. with hydrogen under pressure until hydrogen absorption ceased. The reaction mixture was filtered and the filtrate distilled through an efficient fractionating column. There was obtained 17.6 parts of p-aminophenyl trifluoromethyl ether (p-trifluoromethoxyaniline) as a substantially colorless liquid, B.P. 93.7° C./mm.; $n_D^{25}$, 1.4601. The identity of the compound, p-$NH_2C_6H_4$-$OCF_3$, was confirmed by the nuclear magnetic resonance and ultraviolet absorption spectra and by elemental analysis.

*Analysis.*—Calcd. for $C_7H_6F_3NO$: C, 47.5; H, 3.40; F, 32.2; N, 7.9. Found: C, 47.7; H, 3.24; F, 32.9; N, 6.7.

EXAMPLE III.—o-TRIFLUOROMETHOXYPHENYL-HYDRAZONE OF CARBONYL CYANIDE

The general procedure of Example I was repeated except that 10.6 parts of o-trifluoromethoxyanilinehydrochloride was used. There was obtained, after recrystallization, 8 parts of large orange crystals of o-trifluoromethoxyphenylhydrazone of carbonyl cynanide, M.P. 90–90.5° C.

The o-trifluoromethoxyaniline used above was obtained as follows:

A mixture of 24 parts of o-nitrophenyl fluoroformate, 16 parts of sulfur tetrafluoride, and 6 parts of hydrogen fluoride was heated under autogenous pressure at 100° C. for two hours, at 150° C. for two hours, and at 175° C. for four hours. The crude product (32.1 parts) was dissolved in methylene dichloride and the solution stirred with powdered sodium fluoride. Following filtration and fractional distillation there was obtained 16.5 parts of o-nitrophenyl trifluoromethyl ether (o-trifluoromethoxynitrobenzene), a water-white liquid, boiling at 93° C./ 9.5–10 mm.; $n_D^{25}$, 1.4569. The identity of the compound was confirmed by the infrared and nuclear magnetic spectra and by elemental analysis.

*Analysis.*—Calcd. for $C_7H_4F_3NO_3$: C, 40.6; H, 1.95; F, 27.5; N, 6.77. Found: C, 41.3, 41.1; H, 2.31, 2.09; F, 27.8; N, 7.03.

Reduction of the nitro group of the o-nitrophenyl-trifluoromethyl ether by the general procedure employed for the meta and para isomers gave o-trifluoromethoxyaniline.

EXAMPLE IV.—2,5 - BIS - TRIFLUOROMETHOXY-PHENYLHYDRAZONE OF CARBONYL CYANIDE

The 2,5-bis-trifluoromethoxyaniline, prepared as described below, was purified by sublimation of its hydrochloride. The hydrochloride, 9.73 parts, was suspended in a solution of 8.43 parts of 12 N hydrochloric acid in 100 parts of water, in which it was insoluble, and the mixture cooled to below 0° C. by adding ice. A solution of 2.33 parts of sodium nitrite in 15 parts of water was added and the mixture stirred vigorously. An orange precipitate formed. The solution was filtered and 2.2 parts of malononitrile added to the filtrate. The solution was then neutralized by adding sodium hydroxide solution. A cream-colored precipitate formed which was removed by filtration and purified by recrystallization from methanol-water. The product, 4.51 parts, 37%, melted at 76.5° C.

*Analysis.*—Calcd. for $C_{11}H_4O_2N_4F_6$: C, 37.3; H, 1.13; N, 32.2. Found: C, 38.92; H, 1.36; N, 32.17.

The infrared absorption spectrum on a mineral oil mull showed bands at 3290, 2260, 1630, 1550, 1520, and general absorption from 1270 to 1140. Bands were also present at 1020, 894, 849, and 820 cm.$^{-1}$. The product was insoluble in water but soluble in dilute sodium carbonate solution. These properties are compatible with the structure of the 2,5-bis-trifluoromethoxyphenylhydrazone of carbonyl cyanide.

The 2,5-bis-trifluoromethoxyaniline was obtained as follows:

A mixture of 16.5 parts of hydroquinone and 25 parts of carbonyl difluoride was heated at 150° C. for one hour and 180–190° C. for 2–3 hours. There was then added to the reaction vessel 35 parts of sulfur tetrafluoride and the reaction mixture heated at 100° C. for two hours, 150° C. for two hours, and 150–175° C. for two hours. There was obtained 19.7 parts of p-bis(trifluoromethoxy)benzene as a water-white liquid with the following properties: B.P. 129° C.; M.P. 6° C.; $n_D^{25}$, 1.3683. Its identity was confirmed by the ultraviolet absorption and nuclear magnetic resonance spectra and by elemental analysis.

*Analysis.*—Calcd. for $C_8H_4F_6O_2$: C, 39.0; H, 1.64; F, 46.3. Found: C, 39.3; H, 1.73; F, 46.4.

A reaction vessel (capacity, 200 parts of water) was charged with 24.6 parts of p-bis(trifluoromethoxy)benzene and 150 parts of concentrated sulfuric acid. The mixture was stirred and 21.3 parts of concentrated nitric acid added dropwise. The reaction vessel was cooled in an ice bath to maintain the temperature at 20–25° C. After addition of nitric acid, the solution was stirred until no temperature rise occurred when the cooling bath was removed. The solution was poured onto cracked ice with vigorous stirring and agitation continued for 20 minutes. The aqueous mass was extracted twice with pentane (employing about 75 parts of pentane each time). The pentane extracts were dried over anhydrous magnesium sulfate and filtered. The filtrate was fractionally distilled to yield 18.3 parts of 2,5-bis(trifluoromethoxy) nitrobenzene, a colorless liquid, B.P. 89.5° C./9.5 mm.; $n_D^{27}$, 1.4139. The identity of the compound was confirmed by its infrared, ultraviolet, and nuclear magnetic resonance spectra and by elemental analysis.

*Analysis.*—Calcd. for $C_8H_3F_6NO_4$: C, 33.0; H, 1.10; F, 39.2; N, 4.82. Found: C, 33.7; H, 1.33; F, 39.3; N, 4.44, 4.72.

A pressure vessel was charged with 15 parts of 2-nitro-1,4-bis(trifluoromethoxy)benzene, about 39 parts of ethanol, an amount of hydrochloric acid corresponding to the molar quantity of nitro group present, and about two parts of platinum oxide catalyst. Hydrogen under 40 lb./sq. in. pressure was introduced at 25° C. for one hour. There was obtained 13.13 parts of 2,5-bis(trifluoromethoxy)aniline hydrochloride, M.P. 98.5–100° C.

EXAMPLE V. — TRIFLUOROMETHOXYCHLOROPHENYLHYDRAZONES OF CARBONYL CYANIDE

A mixture of 2.34 parts of 2-trifluoromethoxy-5-chloroaniline hydrochloride and 2-chloro-5-trifluoromethoxyaniline hydrochloride, obtained by reducing the nitration product of p-trifluoromethoxychlorobenzene, was dissolved in four parts of concentrated sulfuric acid and diazotized by adding 0.7 part of solid sodium nitrite dissolved in four parts of concentrated sulfuric acid. The diazonium solution was allowed to stand at room temperature for 15 minutes and then diluted with five parts 85% o-phosphoric acid. After a few minutes, two parts of urea was added and the solution filtered. To this filtrate, 0.66 part of malononitrile was added and the solution made slightly alkaline. The red-brown solution was filtered and acidified. The orange precipitate which formed, 2.14 parts, was a mixture of the 2-trifluoromethoxy-5-chlorophenylhydrazone of carbonyl cyanide and the 2-chloro-5-trifluoromethoxyphenylhydrazone of carbonyl cyanide. The mixture melted from 73 to 100° C. and represented a 76% yield.

The mixture of isomers of aminochlorotrifluoromethoxybenzene was obtained as follows:

A mixture of 32 parts of p-chlorophenol and 25 parts of carbonyl difluoride was heated at 50° C. for one hour and 100° C. for 2–3 hours. There was then added to the reaction vessel 30 parts of sulfur tetrafluoride and the mixture heated at 100° C. for two hours, 150° C. for two hours, and 175° C. for two hours. There was obtained 28.4 parts of p-chlorophenyl trifluoromethyl ether (p - trifluoromethoxychlorobenzene - p - Cl - $C_6H_4$-$OCF_3$) as a water-white liquid, boiling at 81° C./100 mm.; $n_D^{25}$, 1.4338. Its identity was confirmed by the ultraviolet absorption and nuclear magnetic resonance spectra and by elemental analysis.

*Analysis.*—Calcd. for $C_7H_4ClF_3O$: C, 42.8; H, 2.05; F, 29.0; Cl, 18.0. Found: C, 43.2; H, 2.36; F, 28.7; Cl, 18.0.

A glass reaction vessel was charged with 45 parts of concentrated sulfuric acid and 11.29 parts of p-chlorotrifluoromethoxybenzene. The mixture was stirred and approximately five parts of concentrated nitric acid added to it slowly and carefully. After the vigor of the exothermic reaction subsided, the mixture was poured with stirring onto chopped ice. The reaction mass was extracted with methylene chloride and the extract dried over calcium chloride and distilled through an efficient fractionating column. There was obtained 13.9 parts of mixed o-nitro-p-chlorotrifluoromethoxybenzene and m-nitro-p-chlorotrifluoromethoxybenzene, boiling at 63–65° C./0.9–1.1 mm. pressure; $n_D^{25.7}$, 1.4780–1.4788. The principal fraction (5.64 parts) boiled at 65° C./1.1 mm.; $n_D^{25.7}$, 1.4782. The nuclear magnetic resonance spectra showed that the product was an approximately 50/50 mixture of the two possible isomers.

*Analysis.*—Calcd. for $C_7H_3O_3F_3ClN$: F, 23.61; Cl, 14.70. Found: F, 23.70; Cl, 14.63.

A pressure vessel was charged with 8.6 parts of chloronitrotrifluoromethoxybenzene, 39 parts of ethanol, and a quantity of hydrogen chloride which was the molar equivalent of the nitro compound. A small quantity (2.0 parts) of platinum oxide catalyst was added to the reaction mass. The pressure vessel was attached to a source of hydrogen at 40 lb./sq. in. pressure and the compound reacted with hydrogen at room temperature. Absorption of hydrogen was completed in a short time. The reaction mixture was filtered and the filtrate evaporated to dryness under reduced pressure. There was obtained 8.3 parts of a solid which sublimed under reduced pressure to yield 7.5 parts of the hydrochlorides of a mixture of o-amino-p-chlorotrifluoromethoxybenzene and m-amino-p-chlorotrifluoromethoxybenzene, a pale yellow solid, M.P. 122–130° C. The product was insoluble in water and slightly soluble in ether.

EXAMPLE IV.—p - PENTAFLUOROETHOXYPHENYLHYDRAZONE OF CARBONYL CYANIDE

Five parts of p-pentafluoroethoxyaniline hydrochloride was dissolved in water containing 3 parts of 37% hydrochloric acid. Ice and a solution of 1.31 parts of sodium nitrite in the minimum amount of water was added to the solution. A solution of 1.25 parts of malononitrile in the minimum amount of water was then added, and the reaction mixture made alkaline with sodium hydroxide. A clear, deep-orange solution resulted. This was acidified with hydrochloric acid to give 4.4 parts of a lemon-yellow solid which melted at 194–197°C., with decomposition, after recrystallization from chloroform. The infrared absorption spectrum was consistent with the structure of the p-pentafluoroethoxy phenylhydrazone of carbonyl cyanide.

A 5 p.p.m. solution of this compound in water added to the roots of ten-day old squash seedlings caused severe retardation of growth of the seedlings, and particularly of the plant roots, without visible damage to the foliage.

The p-pentafluoroethoxyaniline used above was obtained as follows: Trifluoromethylacetate of p-nitrophenol (23.5 parts) [B.P. 104° C. at 4 mm. prepared from trifluoroacetyl chloride and nitrophenol], 15 parts of sulfur tetrafluoride and 5 parts of hydrogen fluoride were heated at 100° C. for 2 hours, 140° C. for 2 hours and 160° C. for 2 hours to give p-nitropentafluoroethoxybenzene (B.P. 77° C. at 6 mm. and M.P. about 34° C.).

*Analysis.*—Calcd. for $C_8H_4F_5NO_3$: C, 37.37; H, 1.57; N, 5.45; F, 36.95. Found: C, 37.38; H, 1.81; N, 5.03; F, 37.04.

The preceding compound was reduced in 83% yield by platinum oxide catalyst in ethanol and hydrogen chloride in the manner given in the preceding examples to give p-pentafluoroethoxyaniline hydrochloride.

*Analysis.*—Calcd. for $C_8H_6F_5NO \cdot HCl$: C, 36.45; H, 2.67; N, 5.32; F, 36.13. Found: C, 36.36; H, 2.97; N, 5.39; F, 36.14.

EXAMPLE VII. — p - (NONOFLUORO-N-BUTOXY) PHENYLHYDRAZONE OF CARBONYL CYANIDE

The hydrochloride of p - (perfluoro-n-butoxy)-aniline, 4.13 parts, was dissolved in 50 parts of water containing 2.5 parts of 37% hydrochloric acid and 10 parts of tetrahydrofuran. Ice was added to the solution and then 0.7 parts of sodium nitrite dissolved in water. After a few minutes, 0.66 part of malononitrile dissolved in water was added and the solution made alkaline with sodium hydroxide. A deep-brown solution resulted which, on acidification, deposited 2.4 parts of brown solid. After recrystallization from chloroform, the solid which melted at 152–156° C. was the p-(perfluoro-n-butoxy)-phenylhydrazone of carbonyl cyanide.

This compound exhibited the same activity toward squash seedlings as that of Example VI except that the concentration was about 5 times greater.

The p-(perfluoro-n-butoxy)aniline was obtained as follows: p-(heptafluoro-n-butyryl)-nitrophenol was prepared by reaction of nitrophenol with perfluorobutyryl chloride. The resultant perfluorobutyryl nitrophenol (33.5 parts) was reacted with sulfur tetrafluoride (15 parts) and hydrogen fluoride (5 parts) at 100–160° C. as indicated in Example VI. There was obtained p-(nona-fluoro-n-butoxy)nitrobenzene, B.P. 80° C. at 2.2 mm., $n_D^{25}$, 1.4048.

Analysis.—Calcd. for $C_{10}H_4F_9NO_3$: C, 33.63; H, 1.13; N, 3.92; F, 47.88. Found: C, 34.30; H, 1.32; N, 4.41; F, 48.08.

The latter compound was reduced by platinum oxide in ethanol/hydrochloride to give p-(nonafluoro-n-butoxy)-aniline hydrochloride.

EXAMPLE VIII.—p-TRIFLUOROMETHYLTHIO-PHENYLHYDRAZONE OF CARBONYL CYANIDE p-Trifluoromethylthionitrobenzene was reduced to the amine using a $PtO_2$ catalyst. A sample of the amine was diazotized and coupled with malononitrile. The p-trifluoromethylthiophenylhydrazone of carbonyl cyanide was bright yellow, and after recrystallization from chloroform, melted at 168° C.

EXAMPLE IX.—m-TRIFLUOROMETHYLTHIO-PHENYLHYDRAZONE OF CARBONYL CYANIDE

Repetition of the general procedure of Example VIII with the meta isomer gave m-trifluoromethylthiophenylhydrazone of carbonyl cyanide having an M.P. of 140° C.

EXAMPLE X.—p-(1,1,2,2-TETRAFLUOROETHYLTHIO)PHENYLHYDRAZONE OF CARBONYL CYANIDE

A sample of p-1,1,2,2-tetrafluoroethylthioaniline was diazotized in the usual manner and coupled with malononitrile. The product, i.e., p-(ω-hydroperfluoroethylthio) phenylhydrazone of carbonyl cyanide, was a yellow solid (10.3 g. or 68% yield) after recrystallization from chloroform. The melting point was 163.5° C.

EXAMPLE XI.—m-(1,1,2,2-TETRAFLUOROETHYLTHIO)PHENYLHYDRAZONE OF CARBONYL CYANIDE

A sample of m-nitro 1,1,2,2-tetrafluoroethylthiobenzene was reduced catalytically to the amine and diazotization and coupling with malononitrile carried out in the usual manner. A yield of 6.8 g. from 9 g. of amine, or 45%, was obtained. The dull yellow crystals of m-(ω-hydroperfluoroethylthio)phenylhydrazone of carbonyl cyanide melted at 107° C., after recrystallization from ether-petroleum ether.

EXAMPLE XII.—m-PENTAFLUOROETHOXYPHENYLHYDRAZONE OF CARBONYL CYANIDE

A solution of 10.5 g. of m-aminopentafluoroethoxybenzene in 11.7 ml. of concentrated hydrochloric acid plus 300 ml. of water was chilled in ice and one equivalent of sodium nitrite added in a small amount of water. A slight excess of malononitrile was then added and the solution was made alkaline with sodium hydroxide. A small amount of orange solid remained undissolved. This was removed by filtration and discarded. Acidification of the filtrate gave 13 g. of a yellow product which was recrystallized from benzene-ethyl acetate to yield yellow crystals melting at 179° C. The infrared absorption was consistent with that for the structure m-perfluoroethoxyphenylhydrazone of carbonyl cyanide.

EXAMPLE XIII.—p-(1,1,2,2-TETRAFLUOROETHOXY)PHENYLHYDRAZONE OF CARBONYL CYANIDE

A 0.05 mole sample of p-1,1,2,2-tetrafluoroethoxyaniline was diazotized in the usual way and coupled with a slight excess of malononitrile. The product, i.e., p-(ω-hydroperfluoroethoxy)phenylhydrazone of carbonyl cyanide, after recrystallization from chloroform-ethanol, melted at 177.5° C.

Analysis.—Calcd. for $C_{11}H_6ON_4F_4$: C, 46.2; H, 2.10; N, 19.6; F, 26.6. Found: C, 46.3; H, 2.06; N, 19.25; F, 25.78.

The infrared absorption was consistent with that expected for the proposed structure.

EXAMPLE XIV.—m-(1,1,2,2-TETRAFLUOROETHOXY)PHENYLHYDRAZONE OF CARBONYL CYANIDE

Diazotization and coupling with malononitrile of a sample of m-1,1,2,2-tetrafluoroethoxyaniline was carried out as Example XIII. The product, m-(ω-hydroperfluoroethoxy) phenylhydrazone of carbonyl cyanide, was bright yellow and after recrystallization from chloroform melted at 149.5° C., yielding 8.0 g. from 8.45 g. of amine.

Analysis.—Calcd. for $C_{11}H_6ON_4F_4$: C, 46.2; H, 2.10; N, 19.6; F, 26.6. Found: C, 46.33; H, 2.28; N, 19.15; F, 25.33.

The infrared absorption was consistent with that expected from the proposed structure.

New compounds of this invention are active as growth inhibitors. Thus, at a concentration of 10 p.p.m. in water, the p-trifluoromethoxyphenylhydrazone of carbonyl cyanide caused severe retardation of the rate of growth of ten-day-old squash seedlings. The roots of the plants were short and scanty as compared to controls.

When the roots of wire-grass and marigold plants were treated with a concentration of this compound of 100 p.p.m. in water, the plants were killed.

Use of the compound as a foliar spray (in aqueous sodium carbonate solution) of 1000 p.p.m. concentration retarded the growth of xanthium and lettuce plants.

Similar tests made with the ortho and meta isomers showed them to have the same order of activity.

Table I further illustrates the growth inhibiting properties of polyfluoroalkoxy- and polyfluoroalkylthio-aromatic hydrazones of carbonyl cyanide. The compounds RX—$C_6H_4$—N=N—CH(CN)$_2$ were introduced in water solution to Lemna perpusilla and the dry weight of the plants measured after 7 days and recorded as percent as compared to a control.

*Table I*

| RX | Conc. in p.p.m. | Percent of dry weight of control |
|---|---|---|
| p-HCF$_2$CF$_2$O— | 2 | 65 |
| p-HCF$_2$CF$_2$O— | 10 | (1) |
| p-CF$_3$CF$_2$O— | 2 | 27 |
| p-CF$_3$S— | 1 | 30 |
| p-CF$_3$O— | 1 | 50 |

1 Complete kill.

The compounds RX—$C_6H_4$N=NCH(CN)$_2$ were added in aqueous solution to Artemia salina and the extent of kill of the plant measured after 17 hours, results obtained are recorded in the following table (II):

Table II

| RX | Conc. in p.p.m. | Percent kill |
|---|---|---|
| p-HCF$_2$CF$_2$S— | .5 | 40 |
|  | 1.0 | 100 |
| m-HCF$_2$CF$_2$S— | .5 | 0 |
|  | 1.0 | 20 |
|  | 2.0 | 100 |
| p-HCF$_2$CF$_2$O— | .5 | 0 |
|  | 1.0 | 40 |
|  | 2.0 | 80 |
|  | 4.0 | 100 |
| m-HCF$_2$CF$_2$O | 2.0 | 20 |
|  | 4.0 | 80 |
| p-CF$_3$S | .5 | 100 |
| p-CF$_3$O | .5 | 80 |

The compounds of this invention are unusually effective as uncouplers for biological oxidative phosphorylation. In this well-recognized test compounds within the scope of this invention are several hundred times as effective as 2,4-dinitrophenol, which is accepted as a highly effective uncoupler of oxidative phosphorylation. The new compounds are also unexpectedly superior to hydrazones of carbonyl cyanide which do not have a polyfluoroalkoxy or polyfluoroalkylthio group. Thus, for isolated tomato root mitochondria, p-trifluoromethoxyphenylhydrazone of carbonyl cyanide at a concentration of $6 \times 10^{-8}$ mole per liter effected 50% uncoupling; whereas, p-methoxyphenylhydrazone of carbonyl cyanide required a concentration of $7 \times 10^{-6}$ mole per liter (i.e., about 100 times as much) to produce the same result.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Substituted aromatic hydrazones of carbonyl cyanide wherein the aromatic portion thereof contain 6–12 carbon atoms and represents a member of the class consisting of aromatic hydrocarbon groups, halogenated aromatic hydrocarbon groups wherein the halogen is of atomic number 9–35 inclusive and nitro-substituted aromatic hydrocarbon groups, and wherein said hydrazone of carbonyl cyanide contains at least one substituent consisting of a polyfluoroalkyl group attached to an atom selected from the group consisting of oxygen and sulfur, said atom being attached directly to nuclear carbon of said aromatic group.

2. Substituted aromatic hydrazones of carbonyl cyanide represented by the formula $$(YC_nF_{2n}X)_m ArNHN=C(CN)_2$$

wherein Ar is a $C_6$–$C_{12}$ aromatic group selected from the class consisting of aromatic hydrocarbon groups, halogenated aromatic hydrocarbon groups wherein the halogen thereof is of atomic number 9–35 inclusive, and nitro-substituted aromatic hydrocarbon groups, $m$ and $n$ are integers of at least one, X is selected from the group consisting of oxygen and sulfur, and Y is selected from the group consisting of hydrogen and fluorine.

3. The compounds defined in claim 2 wherein $m$ is an integer from 1–3 inclusive, and $n$ is an integer from 1–10 inclusive.

4. The compounds defined in claim 2 wherein Ar is a halogenated hydrocarbon group.

5. The compounds defined in claim 2 where Ar is a nitro-substituted aromatic hydrocarbon group.

6. Trifluoromethylthiophenylhydrazone of carbonyl cyanide.

7. Trifluoromethoxyphenylhydrazone of carbonyl cyanide.

8. Pentafluoroethoxyphenylhydrazone of carbonyl cyanide.

9. Nonafluoro-n-butoxyphenylhydrazone of carbonyl cyanide.

10. 1,1,2,2-tetrafluoroethylthiophenylhydrazone of carbonyl cyanide.

References Cited by the Examiner

UNITED STATES PATENTS

| | | | |
|---|---|---|---|
| 2,658,889 | 11/53 | Goldberg et al. | 260—465 |
| 2,676,879 | 4/54 | Schlesinger | 71—2.3 |
| 2,676,953 | 4/54 | Ham. | |
| 2,784,070 | 3/57 | Cameron et al. | 71—2.3 |
| 2,815,363 | 12/57 | Rorig | 260—465 |
| 2,820,050 | 1/58 | Hultquist | 260—465 |
| 2,863,860 | 12/58 | Mitchell et al. | 260—193 |
| 3,062,635 | 11/62 | Acker et al. | 71—2.3 |

OTHER REFERENCES

Favrel, Bulletin Societe Chimique de France, 1930, tome 47, pp. 1298–1299.

Gal et al., Cancer Research, 1952, volume 12, No. 8, pp. 565–566.

Wain et al., The Chemistry and Mode of Action of Plant Growth Substances, 1955, p. 120.

CHARLES B. PARKER, *Primary Examiner.*

LEON ZITVER, *Examiner.*